Sept. 21, 1948.   W. H. JAMESON ET AL   2,449,780
WING RAISING DEVICE FOR FLOATING DRY DOCKS
Filed March 18, 1944   11 Sheets-Sheet 1
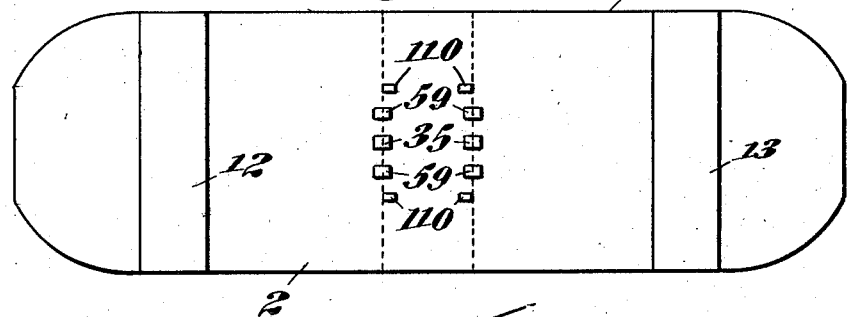
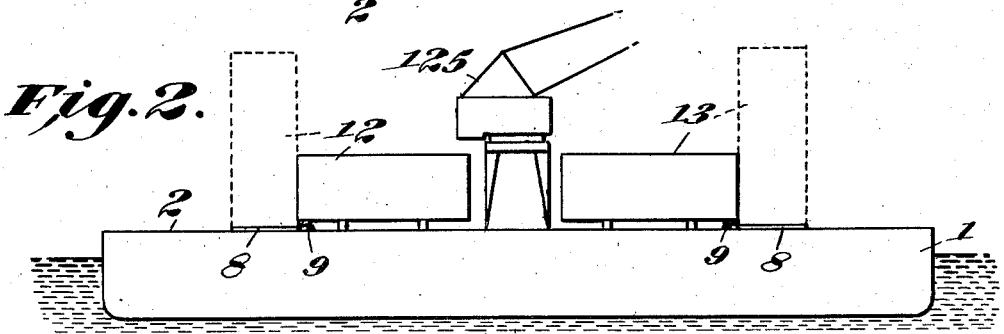
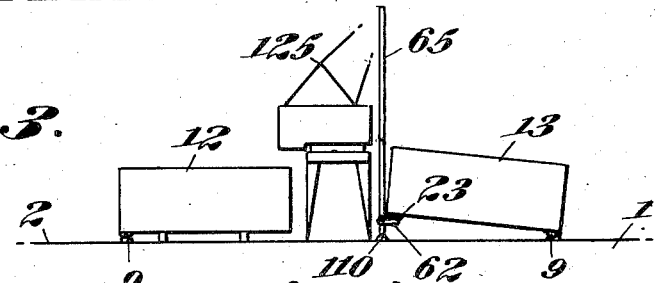
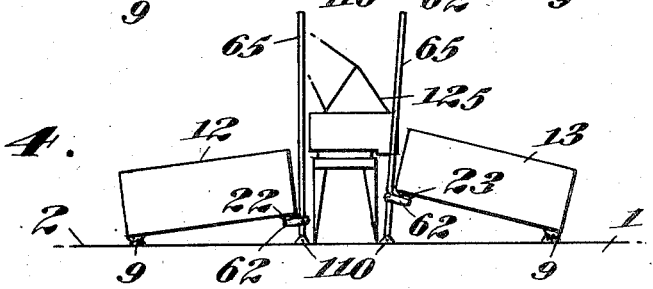
Inventors
William H. Jameson
and E. Leland Durkee.
By R. S. A. Dougherty
Attorney Sept. 21, 1948.   W. H. JAMESON ET AL   2,449,780
WING RAISING DEVICE FOR FLOATING DRY DOCKS
Filed March 18, 1944   11 Sheets-Sheet 2
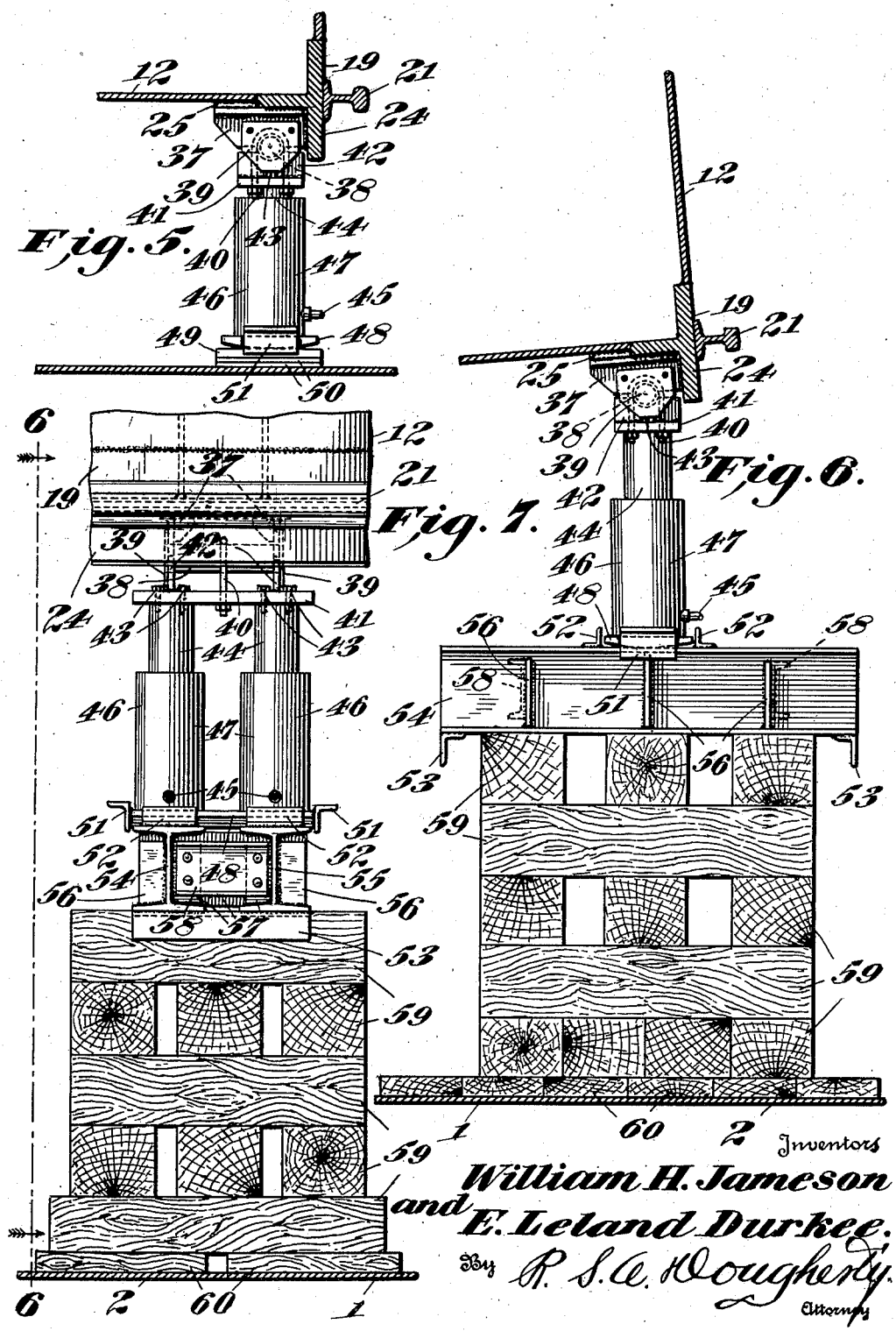

Sept. 21, 1948. W. H. JAMESON ET AL 2,449,780
WING RAISING DEVICE FOR FLOATING DRY DOCKS
Filed March 18, 1944 11 Sheets-Sheet 3
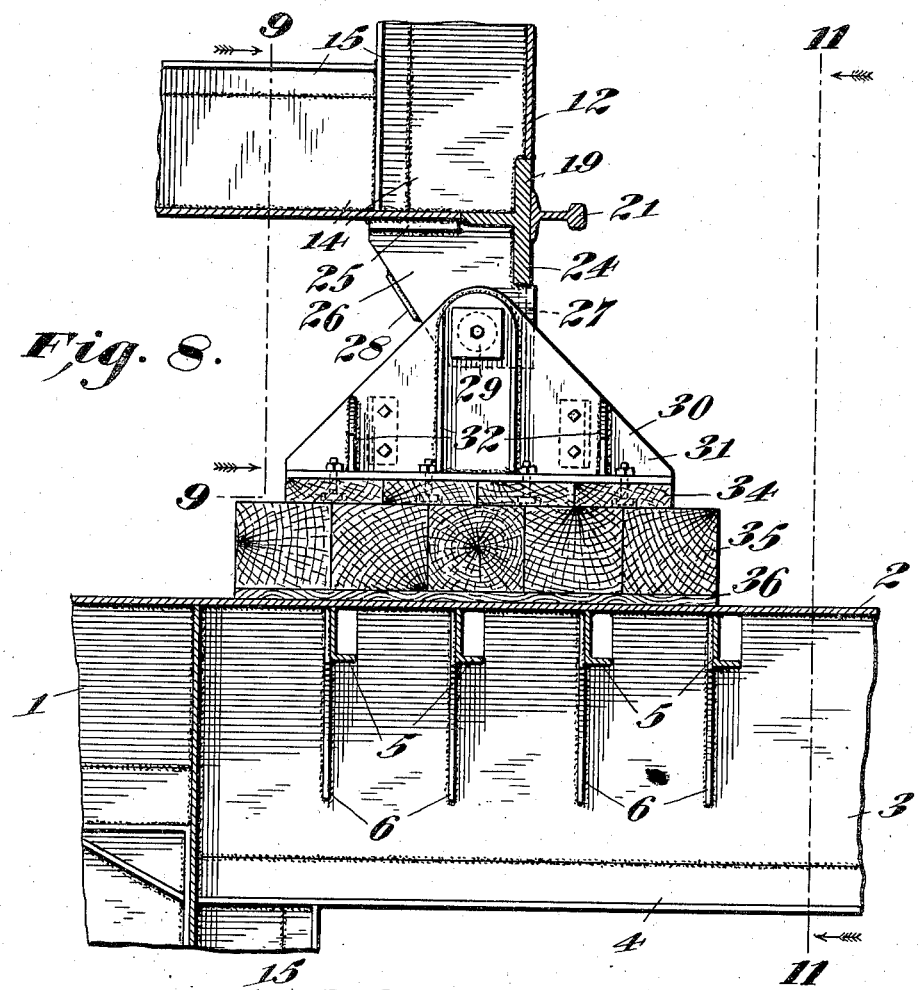
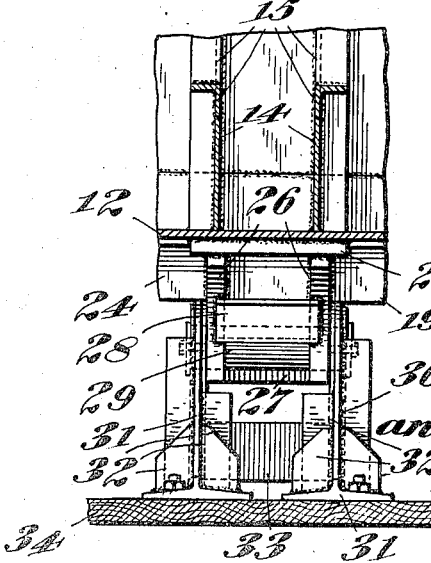
Inventors
William H. Jameson
and E. Leland Durkee.
By R. S. A. Dougherty
Attorney Sept. 21, 1948. W. H. JAMESON ET AL 2,449,780
WING RAISING DEVICE FOR FLOATING DRY DOCKS
Filed March 18, 1944 11 Sheets-Sheet 4
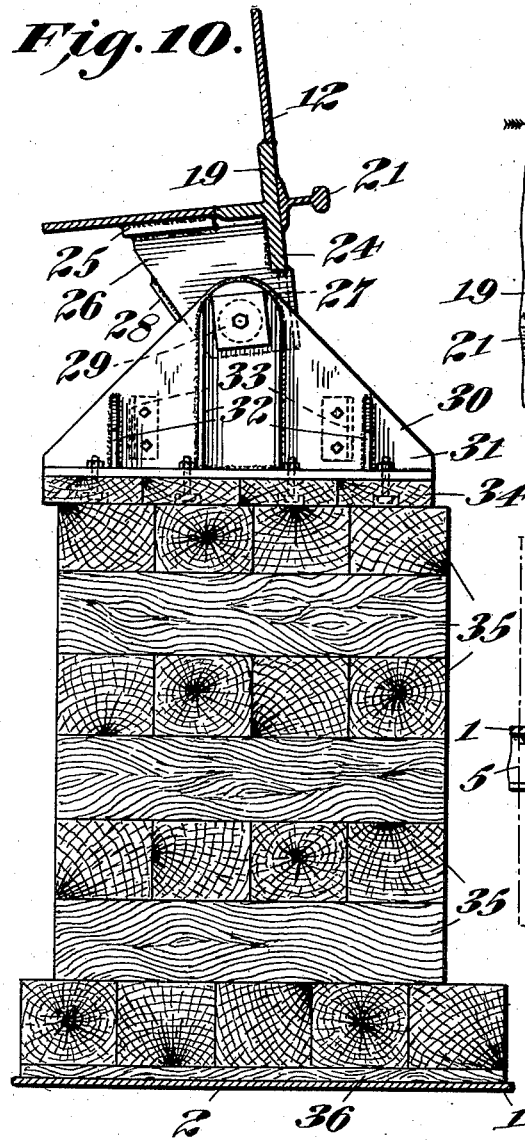
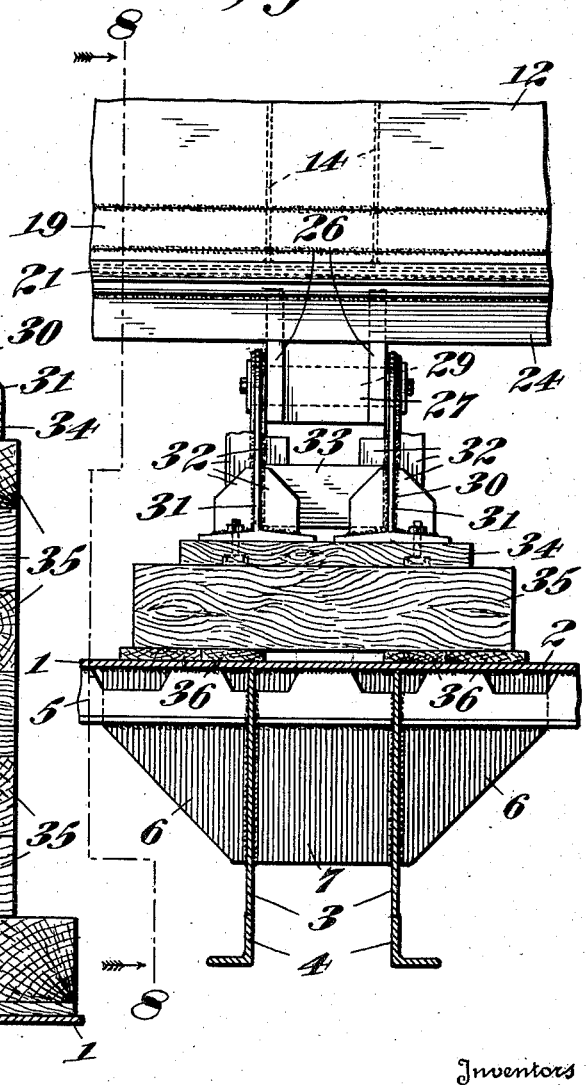
Inventors
*William H. Jameson*
and *E. Leland Durkee.*
By *R. S. C. Dougherty*
Attorney Sept. 21, 1948. W. H. JAMESON ET AL 2,449,780
WING RAISING DEVICE FOR FLOATING DRY DOCKS
Filed March 18, 1944 11 Sheets-Sheet 5
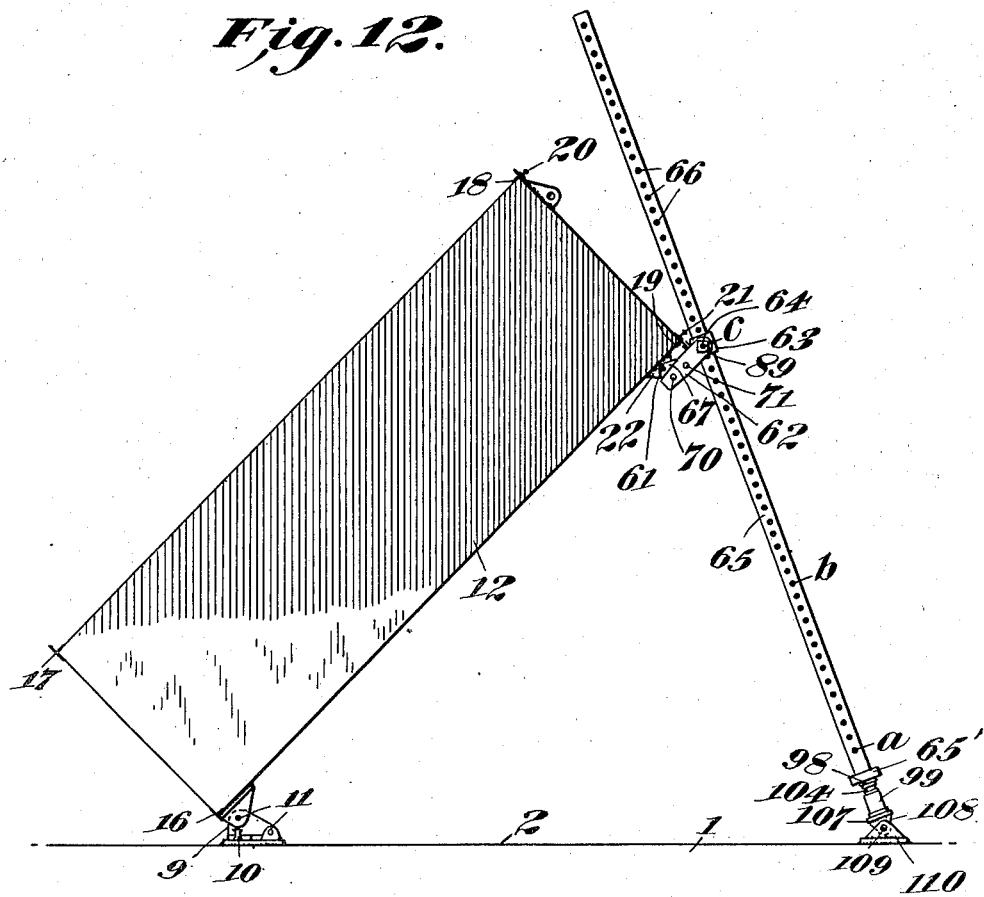
Inventors
William H. Jameson
and E. Leland Durkee.
By R. S. C. Dougherty
Attorney

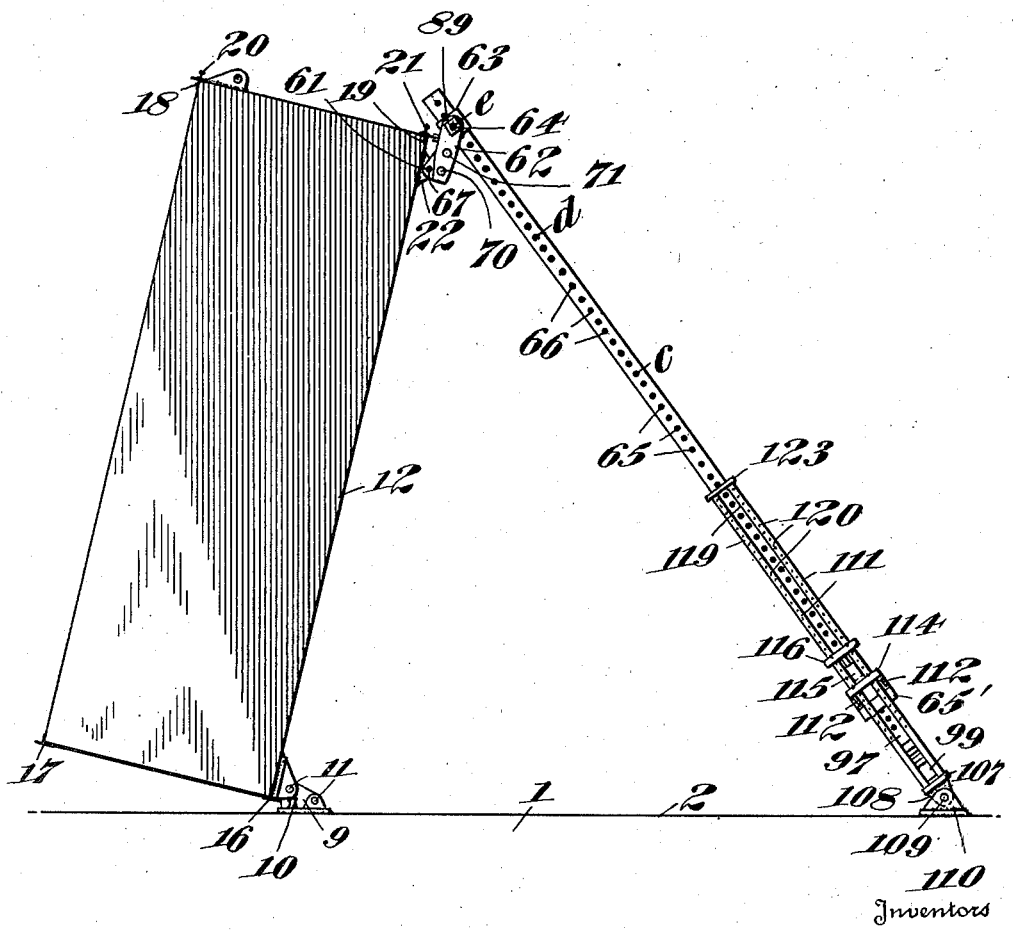

Sept. 21, 1948.   W. H. JAMESON ET AL   2,449,780
WING RAISING DEVICE FOR FLOATING DRY DOCKS
Filed March 18, 1944   11 Sheets-Sheet 7

Inventors
William H. Jameson
and E. Leland Durkee.
By R. S. C. Dougherty
Attorney Sept. 21, 1948.  W. H. JAMESON ET AL  2,449,780
WING RAISING DEVICE FOR FLOATING DRY DOCKS
Filed March 18, 1944  11 Sheets-Sheet 8
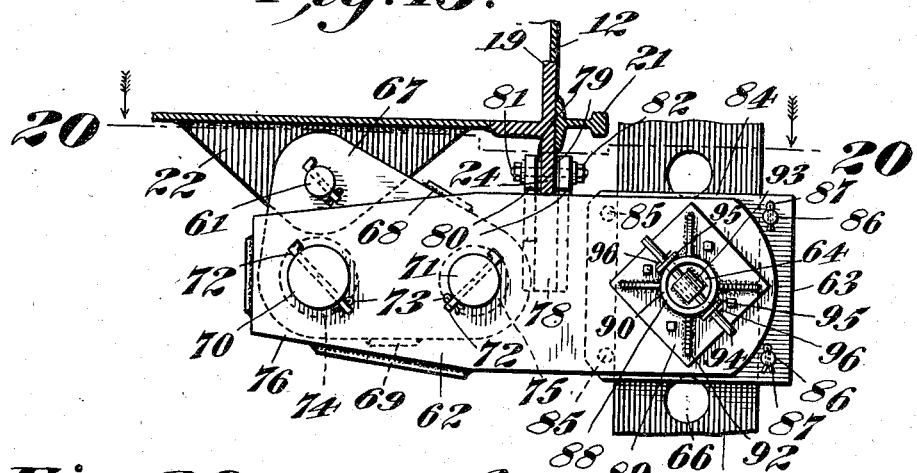
Fig. 19.
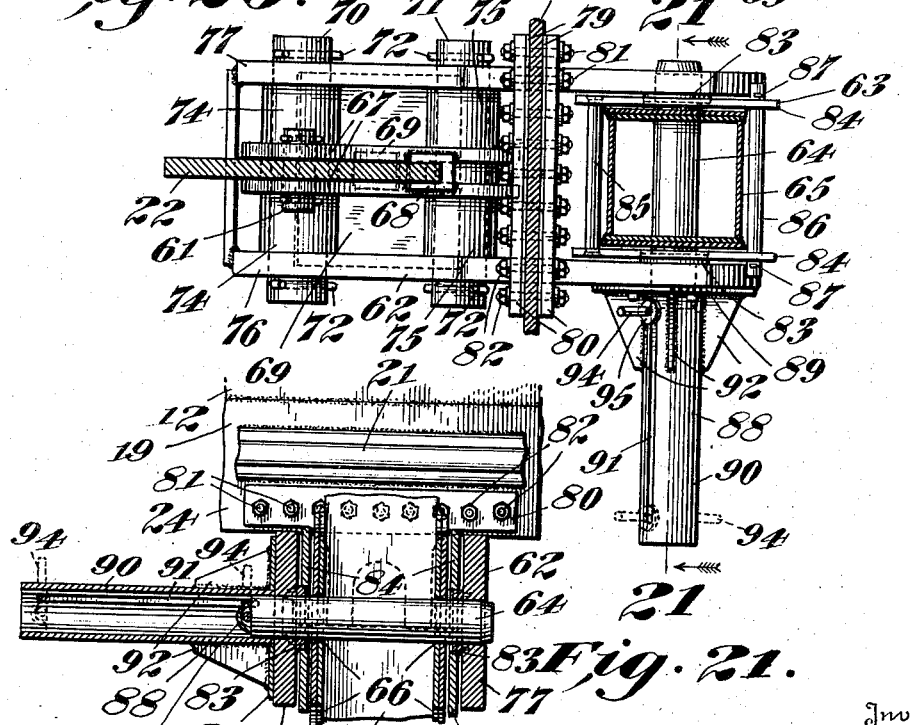
Fig. 20.
Fig. 21.
Inventors
William H. Jameson
and E. Leland Durkee.
By R. S. A. Dougherty.
Attorney

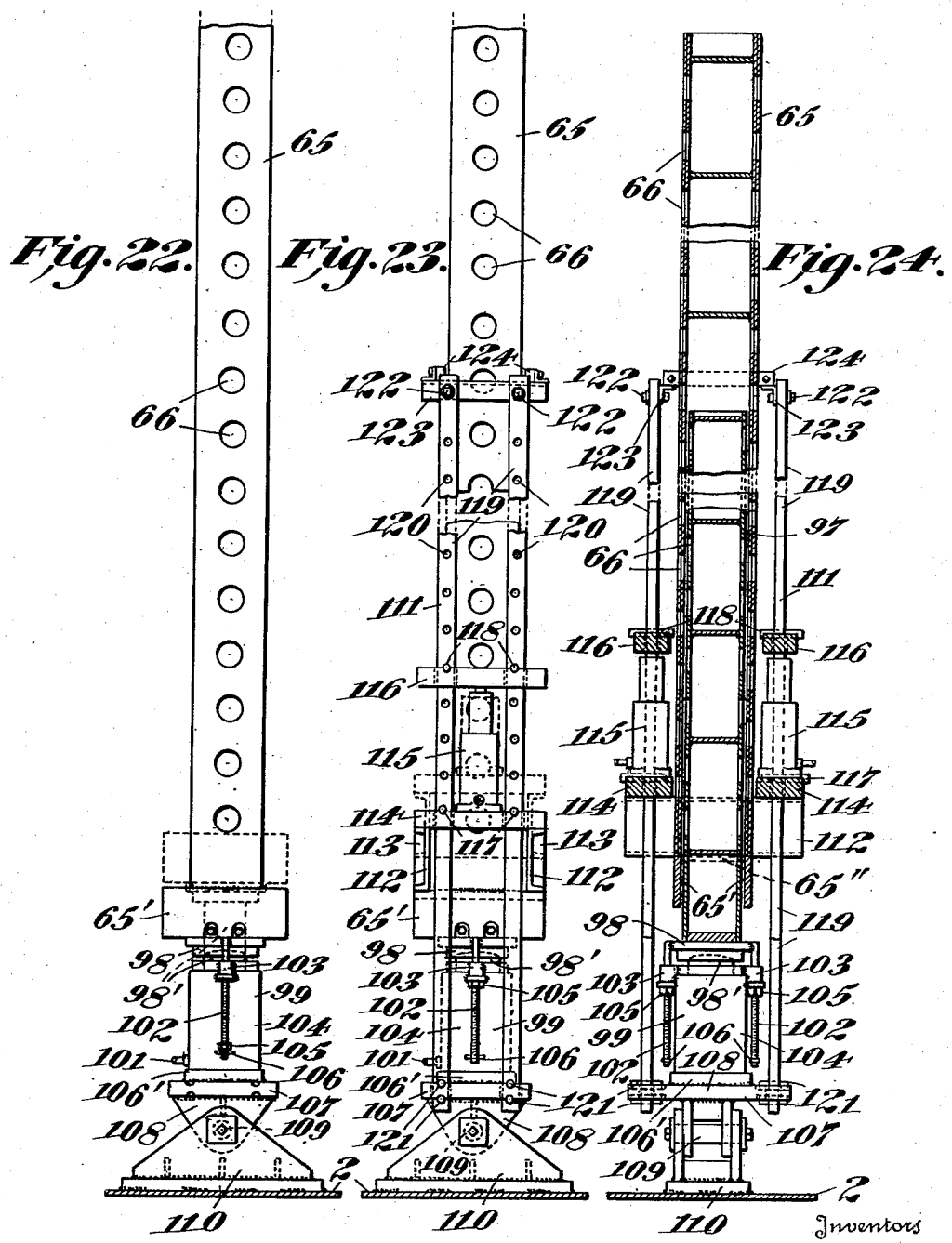

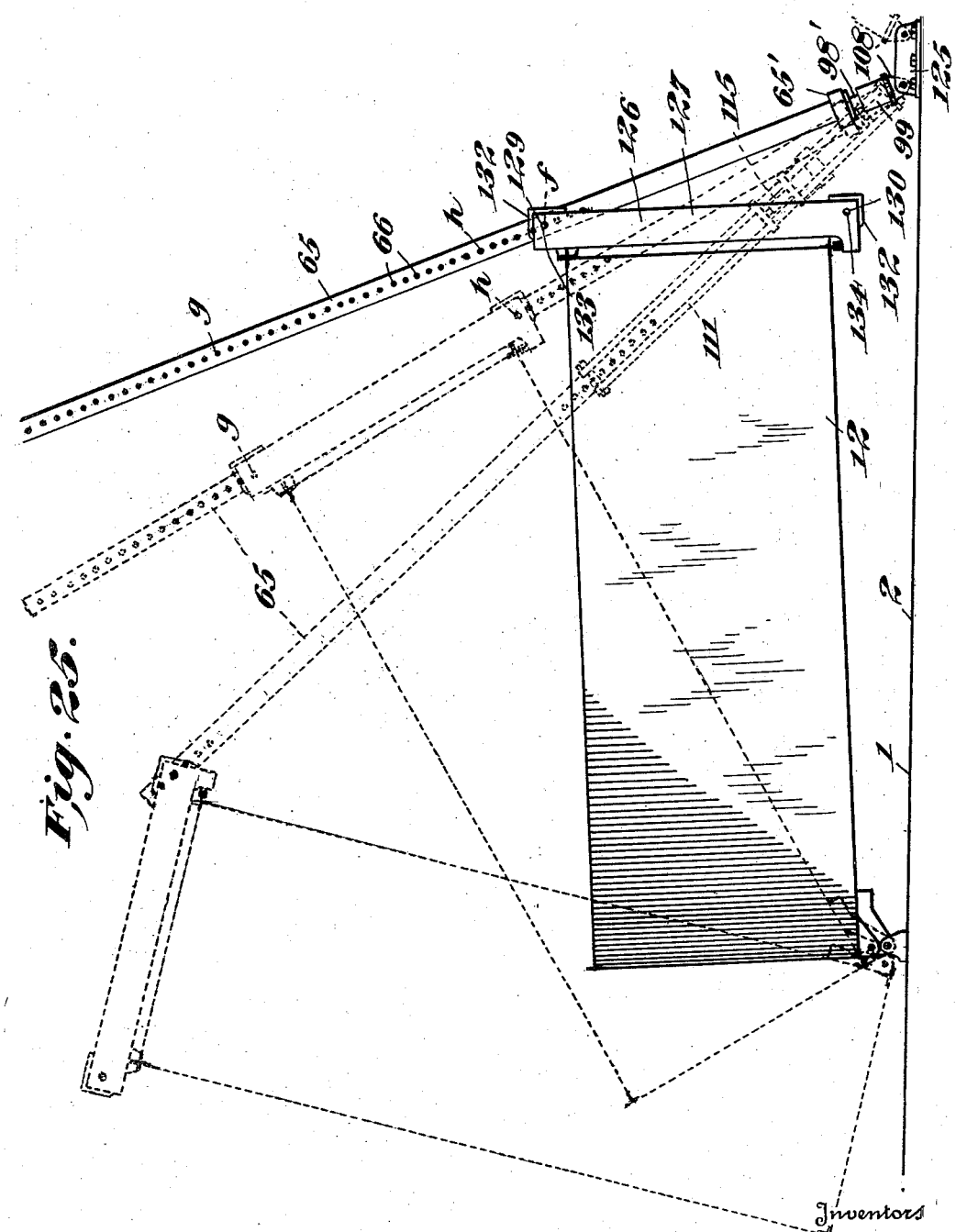

Sept. 21, 1948.  W. H. JAMESON ET AL  2,449,780
WING RAISING DEVICE FOR FLOATING DRY DOCKS
Filed March 18, 1944  11 Sheets-Sheet 11
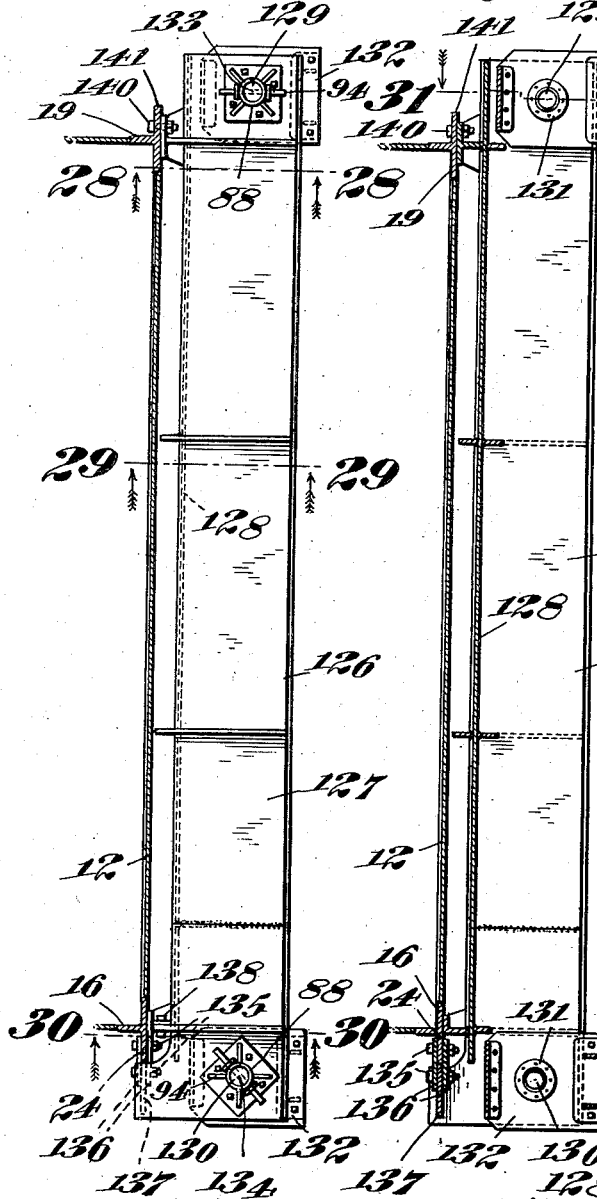
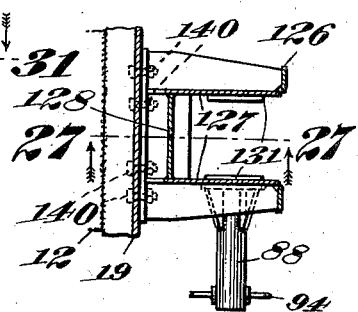
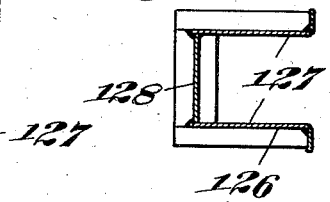
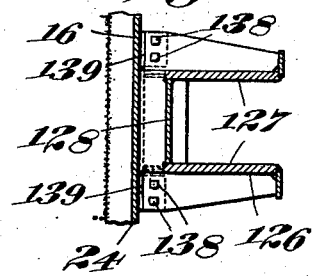
Inventors
William H. Jameson
and E. Leland Durkee.
By R. S. A. Dougherty
Attorney Patented Sept. 21, 1948

2,449,780

UNITED STATES PATENT OFFICE 2,449,780

WING RAISING DEVICE FOR FLOATING DRY DOCKS

William Howe Jameson and E. Leland Durkee, Bethlehem, Pa., assignors to Bethlehem Steel Company, a corporation of Pennsylvania Application March 18, 1944, Serial No. 527,091

23 Claims. (Cl. 114—45)

This invention relates in general to apparatus for manipulating wall sections of great size and weight, and more particularly to apparatus for the safe raising and lowering of hinged side wings on the pontoons of floating dry docks.

Floating dry docks are large partially submersible structures, usually of iron or steel, designed to raise ships out of the water to permit inspection, painting or repair of their underwater portions. As the docks themselves need occasional repaintings, they are sometimes built of a number of separate and independent sections, subdivided for greater stability by water-tight bulkheads, and held together by chains or bolted and/or riveted joints, each section being liftable sideways, in turn, by two or more of the other sections.

Each such section may be said to constitute a large rectangular hollow steel trough, the vertical sides or wings and the horizontal bottom or pontoon providing the buoyant platform upon which the ship rests. The wings may be made integral with the pontoon, but this makes a dangerously high and top-heavy structure for long voyages, as when the dock has to be towed across the ocean to its final destination. In such cases, to diminish wind and wave stresses, the wings are best made folding inboard.

Such wing walls, however, in the larger sizes of docks may weigh as much as several hundred tons, and its has heretofore been thought that raising the hinged heavy walls of this type of dock from prone to upright position could practically be done only by carefully controlled submergence and pumping systems, necessarily involving elaborate compartmentation in the hull and special piping, signaling and control means.

One object of this invention, therefore, is to provide a simple mechanical means for raising and lowering the hinged wings of sectional floating dry docks.

Another object is to avoid the expense and difficulties of conventional submergence and pumping schemes.

A further object is a wing raising system which may be operated by personnel without special skills after a minimum of training.

Other objects, advantages and purposes of our invention will appear hereinafter in the specification and in the appended claims, and in order to describe this invention more clearly we shall now refere to the annexed eleven sheets of drawings forming a part of the specification and in which like figures of reference indicate like parts.

Figure 1 is a top plan view of the dry dock pontoon with the wing walls erected and showing location of bearing shoes and cribbing;

Fig. 2 is a side elevation of a similar pontoon provided with a revolving gantry crane and showing the wing walls in lowered position;

Fig. 3 is another side elevation showing how the preliminary raising of one wing wall while avoiding interference with the revolving gantry crane is accomplished;

Fig. 4 is another side elevatiton similar to Fig. 3 but showing the raising of the second wing wall;

Fig. 5 is a sectional elevation showing one of the pairs of jacks used in the preliminary raise;

Fig. 6 is a sectional elevation taken along the line 6—6 of Fig. 7 and showing one of said pairs of jacks set on timber cribbing during the preliminary raise;

Fig. 7 is a front elevation showing said pair of jacks set on said timber cribbing;

Fig. 8 is a sectional elevation taken on the line 8—8 of Fig. 11 showing the pontoon bracing and one of the center blocking shoes at the start of the preliminary raise;

Fig. 9 is a sectional elevation taken on the line 9—9 of Fig. 8;

Fig. 10 is a sectional elevation showing the blocking shoe in place on the timber crib on completion of the preliminary raise;

Fig. 11 is a sectional elevation taken on the line 11—11 of Fig. 8;

Fig. 12 is a side elevation of one wing wall during the main raise as supported by the jacking column;

Fig. 13 is a side elevation of said wing wall showing the jacking column in tension and controlled by the tension harness;

Fig. 14 is a side elevation of the tension harness;

Fig. 15 is a transverse section taken on the line 15—15 of Fig. 14;

Fig. 16 is a transverse section taken on the line 16—16 of Fig. 14;

Fig. 17 is a transverse section taken on the line 17—17 of Fig. 14;

Fig. 18 is a tansverse section taken on the line 18—18 of Fig. 14;

Fig. 19 is a side elevation of the wing latch and rotating guide frame which support the wing wall during the main raise;

Fig. 20 is a sectional elevation taken along the line 20—20 of Fig. 19;

Fig. 21 is a sectional elevation taken along the line 21—21 of Fig. 20;

Fig. 22 is a side elevation of the lower portion of one of the jacking columns and large compression jack, showing in dotted lines the movement of a step of the main raise;

Fig. 23 is a side elevation, at the commencement of the tensile stage, of the lower portion of one of the jacking columns with the tension harness applied thereto, with the compression jack "killed" and the tension jacks shown extended in full lines, and the movement of the tension jacks and jacking column shown in dotted lines;

Fig. 24 shows the lower portion of the jacking column with tension harness applied thereto as indicated in Fig. 23 but disposed at right angles to said figure with the jacking and guide columns and parts of the tension harness shown in section after the initial movement of the tensile stage;

Fig. 25 is a side elevation of a wing wall provided with a modified form of wing latch, showing in full lines the initial raising position and in dotted lines positions of the man raise and tensile stages.

Fig. 26 is a side elevation of the modification of the wing latch shown in Fig. 25, but drawn to a larger scale;

Fig. 27 is a vertical longitudinal section of said modified wing latch taken on the line 27—27 of Fig. 28;

Fig. 28 is a transverse section of the modified wing latch taken on the line 28—28 of Fig. 26;

Fig. 29 is a transverse section taken on the line 29—29 of Fig. 26;

Fig. 30 is a transverse section taken on the line 30—30 of Fig. 26; and

Fig. 31 is a detail section taken on the lines 31—31 of Fig. 27.

In our invention, the pontoon 1 is provided with a flat deck 2, suitably braced at points of support and concentrated load during lifting by welded reinforcing bulkhead plates 3 and angles 4, joined by serrated stiffeners 5, gusset plates 6 and separators 7. Said pontoon is also provided with coamings or seats 8 and hinges of heavy flanged plate sections 9 held by driven wedges 10, whereon on pins 11 are pivoted the side wing walls 12 and 13, likewise provided with conventional bulkhead reinforcing plates 14 and angles 15.

Said wing walls 12 and 13 are provided at each edge with reinforcing T-bars 16, 17, 18 and 19, and are further braced at the top edges by crane rail sections 20 and 21 and provided with the spaced permanent lifting lugs 22 and 23. Behind the dependent flange 24 of the T-bar 19 is welded the base plate 25, and at the center thereof is tack-welded, for ease of subsequent removal, a pair of perforated pin-plates 26, strengthened by welded front and rear plates 27 and 28. Pivotally attached thereto by pin 29 is a large blocking shoe 30, comprising a portion of a pair of perforated wide flange I-beams 31 having their upper flanges cut away and provided with stiffener bars 32 and diaphragms 33, the bottom flanges of said portions of I-beams 31 being bolted to the top planks 34 resting on the timber cribbing 35, and the bottom planks 36, the latter resting on the deck 2.

In longitudinally spaced relation at each side of the center pair of pin-plates 26 are similarly tack-welded pairs of smaller pin-plates 37, each pair having a pin 38 and keeper plates 39. Pivotally attached to pin 38 by U-bolt 40 is flat plate 41 having side plates 42 and bolted by tap bolts 43 to pistons or plungers 44 which are actuated by fluid admitted through inlets 45 to the cylinders or barrels 46 of the hydraulic jacks 47. Said jacks 47 rest upon the rocker slab 48, which permits the jacks to lean somewhat when their plungers 44 are in extended position, and upon bearing plate 49 and shims 50. Angle lugs 51 are welded to the ends of the rocker slab 48, and angles 52 and 53 are welded to the I-beams 54 and 55, provided with plate stiffeners 56 and 57 and bolted channels 58, upon which rests said bearing plate 49. Timber cribbing 59 and planks 60 are placed thereunder.

In further longitudinally spaced relation at each side of the pin plates 37 are the permanent lifting lugs 22, to each of which is connected by pin 61, wing latch 62, rotating guide frame 63, retractable beveled-end latch pin 64, the rectangular jacking strut or column 65, welded to bracket plates 65' and 65" as in Figs. 14, 15, and 22 to 24, inclusive, and provided with holes 66, spaced apart a little less than maximum jack runout, into which holes 66 said latch pin 64 is successively inserted.

As is shown in detail in Figs. 19 to 21, inclusive, said pin 61 connects lug 22 to a pair of perforated triangular pin-plates 67 connected by small welded plates 68 and 69 and held by the large pins 70 and 71, with smaller bent pins 72 and cotters 73, through spacer sleeves 74 and 75, to oblong side plates 76 and 77 of said wing latch 62. Said side plates 76 and 77 are rounded for clearance at both ends, and provided centrally with welded upright bearing plate 78, filler-plates 79 and bracket-plates 80, cut away at sides and center as shown, secured by bolts 81 and nuts 82 to dependent T-bar flange 24. Rotating on circular collars 83 tap-bolted inside the side plates 76 and 77 is the guide frame 63, comprising two substantially square plates 84 with knocked-off inner corners, held in spaced relation permitting insertion of jacking column 65 by two inner pins 85 welded in place and two outer pins 86 held by cotters 87. Bolted to outer side plate 76 to hold latch pin 64 is guide support 88, comprising centrally perforated square plate 89 to which is welded pipe 90, slotted as at 91 and braced by welded gussets 92. Through said slots 91 and half-pipe 93 welded to the outer end of latch pin 64 passes handle 94, held in place by washers 95 and cotters 96.

Within said jacking column 65 slides freely the relatively short guide column 97, having apertures corresponding to the pin-holes 66, which latter column is bolted or welded securely to the cap 98 on the ram or piston 98' of the large hydraulic jack 99, provided with valve 100 and inlet 101, said cap 98 having welded thereto threaded rods 102 which pass through lugs 103 on the jack barrel or cylinder 104 and have nuts 105 and cotters 106 thereon. The base 106' of said jack 99 is erected on slab 107 forming part of upper bearing shoe 108, pivotally secured by pin 109 to lower bearing shoe 110, which for strength is welded or bolted to pontoon deck 2 directly over and opposite the bulkhead reinforcing plates in the pontoon and wing walls.

Around said jacking column 65 is placed tension harness 111, shown in Figs. 13 to 18, and 22 to 24, inclusive, which comprises two channels 112 mounted on said jacking column 65, reinforced by stiffener bars 113, bolted to the bracket plates 65" and a pair of slabs 114, upon each of which slabs 114 is bolted a hydraulic jack 115, with a second pair of slabs 116 thereabove. Said pairs of slabs 114 and 116, suitably perforated, are held by movable pins 117 and 118 to four corner tension bars 119, which pass therethrough and are provided with series of spaced pin-holes 120 and held by pins 121 in grooves in slab 107 at the bottom and by bolts 122 in rectangular sliding yoke 123 of welded or bolted angles, provided with soft wood rubbing strips 124, at the top.

All the hydraulic jacks aforesaid may be actuated by any suitable fluid, pumped by a conventional power pump through an ordinary piping system and valves (not shown). Certain of the pontoons may also carry a revolving gantry crane 125.

Assuming now that the wing walls are lying down as for ocean travel, the operation of raising them to working position divides naturally into four successive stages, in accordance with shifts in weight distribution, which stages may be described as follows: (1) the preliminary raise; (2) the main raise; (3) the transition stage; and (4) the tensile stage.

In the preliminary raise the wing is merely elevated a sufficient distance to permit the installation of the main lifting devices. The general arrangement of the jacks and cribbing for this stage is shown in Fig. 1, and in more detail in Figs. 5 to 11, inclusive. All holding-down devices (not shown) used to secure the wing walls on blocks during shipment are first removed, center pin-plates 26 and side pin-plates 37 are tack-welded in place beneath each wing wall flange 24, the two pairs of jacks 47, resting on rocker slabs 48, bearing plates 49 and shims 50 are placed in position on deck 2 as in Fig. 5, the shipping bolts (not shown) connecting said rocker slabs 48 and bearing plates 49 are loosened sufficiently to permit the jacks 47 to rock as needed, and said jacks 47 are then attached to the pin-plates 37 by inserting the pin 38.

Said jacks 47 are then connected by flexible copper tubing or the like to the hydraulic jacking system. Center blocking shoe 30, with the planks 34 bolted to its bottom flanges as in Fig. 9, is placed in position under the wing wall flange 24 on the center line of the pontoon deck 2. Said shoe 30 is lifted with a pair of crow bars or other suitable means on to temporary blocking and connected to the pin-plates 26 by raising or lowering the wing wall with the jacks 47 until the pin 29 can be inserted.

The wing is then raised by jacking up until the full runout of the jack plungers 44 is obtained, and the planks 36 and the first layer of timbers 35 of the blocking crib are placed beneath the center shoe 30 as shown in Figs. 8 and 11. The jacks 47 are released by opening their drain valves, and the entire load of the wing is carried on the central crib. The jacks 47 are then fleeted by placing the toe of a track jack or other quick acting jack (not shown) under each angle lug 51 of the rocker slabs 48 and lifting with the drain valves open until the jack plungers 44 are fully retracted into the jack barrels 46. Bearing plates 49 and shims 50 are removed and the I-beams 54 and 55, without the angles 52 and with the angles 53 directed upward, are inserted under each pair of jacks 47.

Said jacks 47 are again pumped up to full runout, another layer of timbers 35 is inserted in the blocking crib, and the jacks are fleeted again by lifting them on the I-beams 54 and 55 with the toes of the pair of track jacks under the angles 53 which are now directed downward. Planks 60 and the first layer of the timbers 59 are placed under the I-beams 54 and 55, and the angles 52 are welded to said I-beams.

These jacking operations are continued, inserting another layer of timbers 35 and 59 at each lift as shown in Figs. 6, 7 and 10, until the proper height for convenient erection of the jacking columns 65 is attained.

The second stage, the main raising of each wing, is accomplished by the two jacking struts or columns 65, which are operated by the hydraulic jacks 99 located between the lower end of said columns and the upper bearing shoe 108, connected by pin 109 to lower bearing shoe 110 welded to the deck 2.

Each inside guide column 97 bolted for shipping with temporary keeper plates (not shown) to the jacking column 65, and with the lower end of the guide column 97 projecting beyond the lower end of the jacking column 65 is assembled to the jack cap 98 on the jack 99 bolted to slab 107. The temporary keeper plates are released, the guide column 97 is slid into the jacking column 65 until the latter bears on the jack cap 98, the temporary keeper plates are replaced, and the telescoped columns are laid out on the deck.

The latch pin 64 and pins 86 are pulled back to permit entry of the column 65, and the column is lifted by the gantry crane 125 or other lifting device so that it hangs approximately vertical but with the top leaning away from the vertical face of the wing wall. The upper bearing shoe 108 is entered into the lower bearing shoe 110 and the shoe pin 109 is driven in. The column 65 is rotated on this pin 109 toward the wing wall, entered into the rotating guide frame 63 on the wing latch 62, and fastened therein by latch pin 64 and pins 86.

The column 65 is now self-supporting, its weight being carried by the shoe pin 109 and by the rotating guide frame 63 on the wing latch 62, so the gantry crane 125 may be released and the temporary keeper plates holding the guide column 97 to the jacking column 65 removed. Nuts 105 on the threaded rods 102 at the sides of the jacks 99 are run out to the cotters 106 to permit full extension of said jacks 99.

The jacks 99 are pumped up together until the wing load is carried entirely on the jacking columns 65, thus freeing the center blocking crib 35 and the side jacking cribs 59 and the jacks 47, which are then removed.

The main raise of each wing, which follows, is divided into two parts. In the first part of this operation the wing latches 62 are raised together from the bottom hole $a$ to the hole $b$ on both jacking columns 65 in successive one-hole lifts, with the jacks 99 hydraulically coupled together so as to carry the load equally. At the top of each lift the load is held entirely at one column and jack while the other column and jack are fleeted by pulling the latch pin 64, lowering the jack ram and column and pinning the wing latch 62 off to the next higher pin hole in the column, then picking up and holding on that jack while the other column is similarly slacked and repinned.

As the wing is raised the load on the jacks diminishes continuously, and for the lift between holes $b$ and $c$, constituting the second part of the main raise, the load is sufficiently reduced to permit raising to the next hole and holding on one column, while the second column is pinned off with its jack closed and the said second jack is pumped up enough to take the entire load. Latch pin 64 in the first column is pulled and the first column is lowered under no load while the second column and jack are pumped up under load and the process repeated. This results in pinning one column in the odd numbered pin-holes only, and the other column in the even numbered holes.

The two wings 12 and 13 on each pontoon section may if desired be raised or lowered virtually simultaneously. However, in the case of pontoon sections carrying a revolving-gantry crane 125 on deck, raising of the wings 12 and 13 may interfere with the operation of the crane in certain positions in which case the wing 13 may be given its preliminary raise. Its two jacking columns 65 are erected with the crane 125, and said wing 13 is raised sufficienty further for its jacking columns 65 to clear the path of the crane 125. The wing 12 may then be given its preliminary raise and so on.

At a certain point in the gradual raising of the wing it will reach a point of equilibrium beyond which it will exert a pull instead of a push on the jacking columns 65, which must thereafter be restrained with a tensile force through the latches 62 instead of propelling with a compressive force. High and gusty winds and the roll and pitch of the pontoon with the waves may cause a fairly wide range of temporary fluctuations between compression and tension, however, so that somewhat below the point of theoretical equilibrium the tension harness 111 actuated by the pairs of hydraulic jacks 115 is attached to each jacking column 65 to ease the elevation through the transition stage without shock or insecurity.

With the wing walls 12 and 13 shown, the transition stage will be between the holes d and e of the jacking columns 65. Each wing is raised in this stage by one jacking column only. This column is jacked up by the use of both the lower jack 99 and the upper jacks 115, with a fixed load of about 10 per cent of the total weight of the wing on the jack 99 at all times to guard against sudden overbalance. In order to maintain the specified load, ascertainable by a pressure gauge (not shown) on said jack 99, excessive pressure being bled through relief valves (not shown) it is necessary to vary the load on the jacks 115 as the load in the column changes. When this first column is being fleeted, the load is laid on the second column, with the jack 99 pushing against slabs 116 through the jacks 115 under the fixed load, thus making it possible for the column to take either tension or compression. By cradling the columns in this manner full control over the motion of the wing is assured at all times, since there is continuously a compressive load in the jack 99 working against a tensile load in the tension harness 111, regardless of the effect of wind or wave action.

Accordingly, the latch pin 64 being withdrawn on the second column, jacking of the first column on its jack 99 is continued until the slabs 114 bear on the pins 117 in their pin-holes 120 on tension bars 119. Pressure on the jack 99 being held as above, the jacks 115 are bled sufficiently to allow said jack 99 to extend and free the slabs 116 from the pins 118, which latter pins are then pulled out and moved to the pin-holes next above. The jacks 115 are pumped up until the slabs 116 again bear against the pins 118 and the pins 117 are freed. Said pins 117 are withdrawn and placed in the next higher pin-holes on the tension bars 119.

Still on the first column, its jacks 115 are bled slowly and jack 99 is simultaneously pumped up until the withdrawn latch pin 64 of the second column registers with the next above pin hole on that column, whereupon the said latch pin 64 is inserted. The jacks 115 of the first column are slacked off fully, transferring the load from the first column to the second column, and the latch pin 64 of the first column is pulled back into its guide support 88.

Jack 99 of the first column is slacked off until the next higher pin hole in that column registers with its latch pin 64, which is then inserted, and pins 117 and 118 are moved to the respective next lower pin-holes 120 in the tension bars 119. Jacks 115 of said first column are pumped up, without moving the column, until the gauge on the jack 99 shows proper pressure, and said jack 99 is raised slightly while bleeding the jacks 115 to free the latch pin 64 of the second column.

These operations are repeated until the wing has been raised to the point where the latch pins 64 have been inserted in the holes e of both columns, which are now in final tension.

In the last or tensile stage, after accidental reversals to compression are no longer possible, the two lower jacks 99 go out of service. Their drain valves are opened and the nuts 105 are screwed up on the threaded rods 102 welded to the jack caps 98 to prevent further movement of these jacks or the inner guide columns 97 to which they are bolted. The pairs of upper jacks 115 in the two tension harnesses 111 together lower the wing to its seat on the coaming 8. Each jacking column 65 in this stage pulls against the pair of slabs 114 which in turn react against the pins 117 in the anchored tension bars 119. Holding on said slabs 114 the jacks 115 are run out until the slab 116 is held by the pins 118 in the pinholes next above in said tension bars. After each such increment the load is held on the slabs 116, the jacks 115 are fleeted, and the slabs 114 are pinned off to the next higher set of holes in the tension bars 119. The telescoping inner guide column 97 is exposed and provides lateral support as the main jacking column 65 pulls away from the jack cap 98 at its base. At the end of this operation the wing wall is bolted to its seat on the coaming 8 and the lifting equipment is removed for other use or storage.

The procedure for lowering the wings is in general the reverse of the raising procedure just described. The jacking columns 65 and tension harness 111 are erected in the extended position in which they were last used in raising the wing walls and pinned off to the wing latches 62 at the hole e. The inside guide columns 97 are extended with the jacks 99 "killed" by screwing up the nuts 105 on the threaded rods 102 welded to the jack caps 98. The upper bearing shoe 108 is pinned by the pin 109 to the lower bearing shoe 110 welded or bolted to the deck 2. The foregoing four stages are then reversed in sequence, until the wing walls are again lowered to their prone position.

For docks having sufficient deck room, as in cases where there are no gantry cranes or other large obstructions, the modifications of our apparatus shown in Figs. 25 to 31 may in some instances be preferred.

With other parts substantially as hereinbefore described, the problem of attaining exact alignment of opposing jacking columns is greatly simplified by the duplex lower bearing shoes 125.

The double-web girder wing latch 126 comprises the pair of web plates 127, welded in spaced parallel relation on back plate 128, for strength of greater thickness at bottom than at top, as shown in Fig. 30, and provided with conventional reinforcing rib-plates, tie-down plates and flanges as shown.

Said wing latch 126 has an upper pin hole 129 and a lower pin hole 130, the spacing therebetween being a suitable multiple, here shown as twenty times, of the spacing between the individual holes 66 of the jacking column 65. At each side of the pin holes 129 and 130 is a collar 131 tap-bolted to the web plates 127 and supporting at each said hole a separate rotating guide frame 132. The upper latch pin 133 and lower latch pin 134 are made retractable as previously described.

A section of the crane rail 21 having been first removed, the wing latch 126 is fastened firmly to the wing wall by the bolts 135 through the dependent flange 24 of the lower edge T-bar 16, bracket plates 136 and bearing plate 137, by the bolts 138 connecting to the lugs 139 welded to said T-bar 16 in alignment with the stem thereof, and by the bolts 140 through the upstanding flange 141 of the upper edge T-bar 19.

In the operation of this latter modification, the preliminary raise and the main raise as heretofore described become one operation, and the blocking shoes 30, jacks 47 and blocking cribs 35 and 59 of the preliminary raise are dispensed with.

Beginning with the upper latch pin 133 of wing latch 126 in the hole f on the jacking strut 65, the wing walls are raised, separately or together, by the bottom jacks 99, pinning as required with said upper latch pin 133, until the neighborhood of hole g on the jacking strut is reached. The upper and lower pin holes 129 and 130 in the wing latch 126 are then brought into exact register with their corresponding holes in the jacking column 65 by carefully manipulating the jacks 99. The lower latch pins 134 are then driven and the upper pins 133 withdrawn, and raising is continued from hole h with the use of the lower pins 134 only. The tension harness 111 is added and functions in the transition and tensile stages exactly as before.

Although we have hereinabove shown and described our invention in considerable detail, we do not wish to be limited to the exact and specific structures and procedures stated, but may use such substitutes, modifications or equivalents thereof as are within the scope and spirit of the invention and of the appended claims.

Having thus described our invention, what we claim as new and useful and desire to secure by Letters Patent is:

1. Apparatus for raising and lowering a wing wall hinged to a flat deck comprising a plurality of wing brackets fixed to said wing wall, a plurality of deck brackets fixed to said deck, each of said wing brackets being in spaced paired relationship with one of said deck brackets in a vertical plane transverse to the axis of said wing wall hinge, and a plurality of jacking struts, each of said jacking struts being pivotally mounted to and between said pairs of brackets for the individual application of forces in both tension and compression to said wing wall.

2. Apparatus for the application of axially opposed forces between a massive object and a relatively fixed fulcrum comprising, a plurality of hinge connections fixed to said object, a plurality of hinge connections fixed to said fulcrum, each of said object hinge connections being in spaced paired relationship with one of said fulcrum hinge connections in a plane parallel to the said axis of opposed forces, and a plurality of jacking struts, each of said jacking struts being pivotally mounted to and between said pairs of hinge connections for the individual application in a straight line of forces in both tension and compression to said object, said jacking strut comprising adjustable strut means and plural hydraulic jack means rigidly attached thereto for the application of loads in both tension and compression individually applied.

3. A floating dry dock section comprising a pontoon portion, opposing wing walls hinged to the pontoon portion, and step-by-step holding and lifting means disposed on the pontoon portion between said wing walls and operatively connected with said wing walls.

4. A floating dry dock section comprising a pontoon, a flat deck on said pontoon, side wing walls hinged to the flat deck, a plurality of lower bearing shoes secured to the deck, an upper bearing shoe rocking in each lower bearing shoe, a pin securing together pivotally said upper and lower bearing shoes, a hydraulic jack mounted on each upper bearing shoe, an extension column having a plurality of spaced holes mounted on each jack, and means for connecting each extension column to a wing wall.

5. Apparatus for the preliminary raising of a wing wall hinged to a flat deck, comprising a blocking shoe dependently pivoted at the longitudinal center of the wing wall, jacking means dependently pivoted to the wing wall at each side of the blocking shoe, and timber cribbing on the deck for supporting the blocking shoe and jacking means as the wing wall is jacked up.

6. Apparatus for the preliminary raising of a wing wall hinged to a flat deck, comprising a pair of large pin-plates attached at the longitudinal center of the wing wall, a blocking shoe pivoted to the pair of large pin-plates, pairs of smaller pin-plates attached to the wing wall in longitudinal spaced relation to the pair of large pin-plates, hydraulic jacking means pivotally attached to each pair of smaller pin-plates, and timber cribbing inserted between the blocking shoe and the deck and between the jacking means and the deck as said jacking means are raised and fleeted.

7. Apparatus for the preliminary raising of a wing wall hinged to a flat deck, comprising a dependent flange the length of the wing wall, a base plate on the wing wall behind said flange, a pair of large pin-plates with central perforations welded to the center of the base plate, reinforcing plates welded to the front and rear of the pin-plates, a centrally perforated blocking shoe comprising the lower portions of a pair of I-beams from which the upper flanges have been cut away, a pin through the central perforations of the large pin-plates and the blocking shoe for pivotally attaching same, pairs of smaller pin-plates with central perforations welded at each side in spaced relation to the central pin-plates on the base plate, a pair of jacks equipped with plungers beneath each pair of smaller pin-plates, a flat plate connecting the plungers of said jacks, a pin through the central perforations in each pair of the smaller pin-plates, a U-bolt pivotally securing the pin to the flat plate, a rocker slab beneath each pair of jacks, and timber cribbing inserted beneath the blocking shoe and the rocker slabs as the wing is raised by the jacks above the deck.

8. Apparatus for raising wing walls hinged to a pontoon deck, comprising a plurality of jacks also hinged to the pontoon deck, a jacking column having a plurality of spaced holes mounted on each jack, and a retractable pin attached to each wing wall and adapted to be inserted into said spaced holes.

9. Apparatus for raising a wing wall hinged to a flat deck, comprising a plurality of lifting lugs on the wing wall, a jack hinged to the deck opposite each lifting lug, a jacking column having a plurality of spaced holes mounted on each jack, a wing latch secured to each lifting lug, a rotatable guide frame on each wing latch, and a retractable latch pin for securing the jacking column to the wing latch and guide frame.

10. Apparatus for raising a wing wall hinged to a flat deck and having a dependent flange, comprising a plurality of spaced lifting lugs welded to the wing wall, a jack hinged to the deck opposite each lifting lug, a jacking column provided with a plurality of spaced holes mounted on each jack, a wing latch secured to each lifting lug and the dependent flange, a guide frame into which the jacking column is inserted having opposed holes and adapted for rotation on the wing latch, a latch pin adapted to be inserted through the holes in the guide frame and in the jacking column to secure them together, a handle for retracting the latch pin, and a slotted pipe guide for supporting said latch pin in retracted position.

11. Apparatus for raising a wing wall hinged to a flat deck and having a dependent flange, comprising a plurality of spaced lifting lugs welded to the wing wall, a jack hinged to the deck opposite each lifting lug, a jacking column having a plurality of spaced holes mounted on each jack, a wing latch secured to each lifting lug and the dependent flange, a pair of circular collars tap-bolted within the wing latch, a guide frame comprising a pair of substantially square plates with knocked-off inner corners adapted for rotation on the circular collars, pins holding said plates apart in spaced relation for insertion of the jacking column, and a retractable pin adapted to secure the guide frame to the jacking column.

12. Apparatus for raising a wing wall hinged to a flat deck and having a dependent flange the length of the wing wall, comprising a plurality of longitudinally spaced lifting lugs welded to the wing wall, a pair of perforated triangular pin-plates about each lifting lug, a pin pivotally connecting each lug and pair of pin-plates, small welded plates reinforcing the pin-plates, a pair of larger pins through the pin-plates, spacer sleeves on each larger pin, oblong side plates kept in spaced relation to the pin-plates by the spacer sleeves, small bent pins transversely through the larger pins and equipped with cotters to retain the side plates, a central upright bearing plate welded transversely between the side plates to support the dependent wing wall flange, bracket-plates welded to the bearing plate adapted to be bolted to said dependent flange, a guide frame pivotally mounted between the side plates, a jack hinged to the deck opposite each lifting lug, a column provided with a plurality of spaced holes mounted on each jack, and a retractable pin adapted to secure the column to the guide frame.

13. Apparatus for raising wing walls hinged to a pontoon deck, comprising a plurality of jacks also hinged to the pontoon deck, a guide column having a plurality of spaced holes mounted on each jack, an outer jacking column with corresponding spaced holes slidably enclosing each guide column, and a retractable pin attached to each wing wall and adapted for insertion into said spaced holes.

14. Apparatus for raising a wing wall hinged to a pontoon deck, comprising a hollow normally upright jacking column having a plurality of openings extending transversely therethrough, a pin attached to the wing wall extensible through any of said openings, a guide column telescopically arranged in the lower end of said jacking column, and a jack secured to the guide column and pivoted to the deck for supporting and lifting together the guide and jacking columns.

15. Apparatus for raising a wing wall pivoted to a flat deck, comprising a plurality of jacks separately pivoted to said deck, a jacking column adapted for step-by-step raising of the wing wall on each jack, and tension means about the jacking column adapted for absorbing sudden stresses on the jacking column.

16. Apparatus for raising a wing wall hinged to a flat deck, comprising a plurality of base members also hinged to the flat deck, an upright compression jack on each base member, an extension column mounted on each compression jack and adjustably connected to the wing wall for raising said wing wall, a removable outer frame attached to the hinged base member, and tension jacks mounted on said outer frame for maintaining a specified load on each compression jack.

17. Apparatus for raising a wing wall hinged to a flat deck, comprising a plurality of lifting lugs on the wing wall, a jack hinged to the deck opposite each lifting lug, a jacking column having a plurality of spaced holes mounted on each jack, a tension harness mounted on the jacking column for maintaining a predetermined tensile load on the jack, a wing latch secured to each lifting lug, and a retractable latch pin for securing the jacking column to the wing latch.

18. Apparatus for raising under tension a wing wall hinged to a flat deck, comprising a plurality of lifting lugs on the wing wall, a guide column hinged to the deck and pivoted to each lifting lug, an outer column slidably mounted on the guide column, outer tension bars with spaced holes secured to the guide column, slabs slidably mounted on the tension bars and held thereto by movable pins, and tension jacks mounted on the slabs for controlling and completing the raise of the wing wall.

19. Apparatus for raising a wing wall hinged to a flat deck, comprising a plurality of base slabs also hinged to said deck in spaced relation to the wing wall, upright tension bars secured to each base slab, a compression jack mounted upright on said base slab, a guide column mounted upright on said jack, a jacking column slidably mounted on said guide column adapted to be adjustably pivoted to the wing wall, jacking slabs mounted on said jacking column, tension jacks mounted on said jacking slabs, bearing slabs liftably mounted on the tension jacks, and adjustable means for securing the jacking slabs and the bearing slabs to the tension bars.

20. Apparatus for raising a wing wall hinged to a flat deck, comprising a plurality of base slabs also hinged to said deck, upright tension bars secured to each base slab, a compression jack having a plunger surmounted by a cap mounted upright on said base slab, means for holding the cap and plunger of said jack in a fixed position when desired, a guide column mounted upright on said jack cap, a jacking bracket normally resting on said jack, a jacking column telescoping over the guide column and having its bottom secured to the jacking bracket and its upper portion adapted to be adjustably pivoted to the wing wall, a yoke connecting the upper ends of the tension bars and adapted to permit the jacking column to slide thereon, transverse outer channels secured above the jacking bracket to the jacking column, a jacking slab mounted on the channels, tension jacks mounted on the jacking slab, bearing slabs liftably mounted on the tension jacks, and adjustable means for securing the jacking slabs and the bearing slabs to the tension bars.

21. Apparatus for raising a wing wall hinged to a flat deck, comprising a plurality of lifting jacks, a jacking column provided with a plurality of spaced holes mounted on each jack, a double web girder wing latch adapted to receive each jacking column attached to said wing wall, and a pair of retractable latch pins mounted on said wing latch and adapted for successively engaging the spaced holes in said jacking column.

22. A dry dock having a pontoon hull, a wall section thereon having hinged connection with said hull, a column supported on the hull and movably connected to said wall section, and power means coupled to act upon said column to move said wall section about said hinged connection to upright or horizontal position.

23. A floating dry dock comprising a pontoon hull, a wing wall hinged to the deck of said hull and adapted to pivot about its hinge from a prone position on said deck to an upright position, the center of gravity of said wall passing through a vertical plane through the axis of said hinge during said pivotal movement, and means for raising and lowering said wing wall comprising a jacking apparatus connected between said hull and wing wall and adapted to withstand both compressive and tensile stresses, said jacking apparatus being subject to a reversal of stress as said center of gravity passes through said plane.

WILLIAM HOWE JAMESON.
E. LELAND DURKEE.

REFERENCES CITED

The following references are of record in the file of this patent:

UNITED STATES PATENTS

| Number | Name | Date |
|---|---|---|
| 1,022,931 | Cunningham | Apr. 9, 1912 |
| 1,117,516 | Petrie | Nov. 17, 1914 |
| 1,279,084 | Crandall | Sept. 7, 1918 |
| 2,165,367 | Gormley et al. | July 11, 1939 |
| 2,319,840 | Barrett | May 25, 1943 |

OTHER REFERENCES

Newsweek Magazine of April 12, 1943, page 38.